United States Patent [19]

Baker

[11] Patent Number: 4,808,031

[45] Date of Patent: Feb. 28, 1989

[54] PIPELINE JOINT PROTECTOR

[76] Inventor: Ralph Baker, 14711 Hoya Ct., Houston, Tex. 77070

[21] Appl. No.: 17,830

[22] Filed: Feb. 24, 1987

Related U.S. Application Data

[63] Continuation-in-part of Ser. No. 889,765, Jul. 28, 1986.

[51] Int. Cl.$^4$ ............................................... F16L 1/04
[52] U.S. Cl. .................................... 405/168; 138/172; 405/158; 405/166
[58] Field of Search ............... 405/154, 169, 170, 171; 285/47, 48, 53, 21; 138/172, 177, 141, 109, 155

[56] References Cited

U.S. PATENT DOCUMENTS

| | | | |
|---|---|---|---|
| 2,057,176 | 10/1936 | Willenberg | 285/47 X |
| 2,773,512 | 12/1956 | Burk | 405/157 X |
| 2,828,800 | 4/1958 | Hopkins et al. | 285/21 X |
| 2,894,538 | 7/1959 | Wilson | 285/53 |
| 3,184,958 | 5/1965 | Eaton | 285/47 X |
| 3,321,925 | 5/1967 | Shaw | 405/166 |
| 3,425,453 | 2/1969 | Fuller | 405/171 X |
| 3,563,276 | 2/1971 | Hight | 156/94 X |
| 3,744,823 | 7/1973 | Muir et al. | 285/21 |
| 3,801,140 | 4/1974 | Keller | 285/47 |
| 4,054,158 | 10/1977 | Hoeman et al. | 285/47 X |
| 4,103,505 | 8/1978 | Howerton | 405/166 |
| 4,147,381 | 4/1979 | Schwarz | 285/53 |
| 4,283,238 | 8/1981 | Jacquemart | 156/94 X |
| 4,449,852 | 5/1984 | Muszynski | 405/166 X |
| 4,609,214 | 9/1986 | Bonjour et al. | 285/53 X |

FOREIGN PATENT DOCUMENTS 3043450 8/1981 Fed. Rep. of Germany ...... 405/157

Primary Examiner—Dennis L. Taylor
Attorney, Agent, or Firm—Pravel, Gambrell, Hewitt, Kimball and Krieger

[57] ABSTRACT

A pipeline joint protector which encircles the exposed end portions of abutting lengths of pipe which are wrapped or covered with concrete weight coating substantially throughout their lengths with only short end sections of the pipe exposed. The pipeline protector extends radially outwardly from the central pipe to approximately the diameter of the weight coat material and substantially spans the space between adjacent portions of weight coat material on the abutting joints of pipe welded together to form the pipe joint. Alternatively, a pipe joint protector formed of a sheet of high density plastic material wrapped around the pipe joints and overlaying the adjacent ends of the weight coat material on such pipe joint and as secured thereto.

7 Claims, 3 Drawing Sheets

PIPELINE JOINT PROTECTOR

This application is a continuation-in-part of pending prior application Ser. No. 889,765 filed July 28, 1986.

BACKGROUND OF THE INVENTION

It is common practice to apply weight coat to a pipeline which is located in a water bottom area to protect the pipe from the elements and also to provide sufficient weight to maintain the pipeline submerged and in a non-buoyant condition. Weight coat is frequently made of a concrete material several inches thick which is applied around the circumference of the pipe and is usually applied to line pipe on each joint prior to adjacent joints of pipe being joined together by welding. The weight coat is applied to the full length of the pipe except for a short distance approximately one foot on each end. These exposed end portions are provided to facilitate welding adjacent exposed ends together to make up the pipeline. Various structures or devices have been employed from time to time to fill the space around the welded exposed pipe joint and between the adjacent sections of weight coat material. Examples of these prior art devices include devices such as are shown in U.S. Pat. Nos. 4,449,852; 4,103,505 and 4,102,137. Other weight coat prior art devices include patents such as U.S. Pat. Nos. 3,232,637 and 3,240,512 which are means for weighting underwater pipelines. None include structures such as the present invention which provides a relatively inexpensive and reliable protective sleeve that may be quickly and easily installed manually, i.e., with hand tools, as the pipe is being strung by the lay barge. The present invention does not require elaborate forming apparatus and is sufficiently strong to withstand impact by trawler boards and the concentrated stress imposed on the pipe by support rollers and particularly the end roller on the stringer attached to a lay barge.

SUMMARY OF THE INVENTION

The present invention includes a thermoplastic impact member or sheet having relatively high compressive strength which is wrapped around a pipe joint formed by welding abutting ends of pipe together. This wrapped portion or sleeve overlaps the ends of the weight coat material adjacent to the joint and is attached to the pipeline by means of straps that encircle the sleeve or by screws or rivets or other means such as by welding the first end of the sheet material to the adjacent outer surface of the sheet after being wrapped around the pipeline. Reinforcing members such as plastic bars or tubes may be affixed to the interior of the sleeve to increase its rigidity and impact resistance Alternatively, a plurality of high impact thermoplastic members are secured together side by side by straps which are connected at their free ends to secure the plurality of plastic members in place in the space around the pipe joint between the adjacent sections of concrete or other weight coat material. The plastic members are of a cross-sectional thickness which is substantially the same as a thickness of a weight coat material which has been provided on the pipe to provide a relatively smooth uniform outer surface to the weight coated pipeline and not to expose any projections that may be snagged by a net or trawler as such devices are drug along the ocean floor and across the pipeline when in place on the water bottom.

DESCRIPTION OF THE PREFERRED EMBODIMENT

Figures 1, 2:
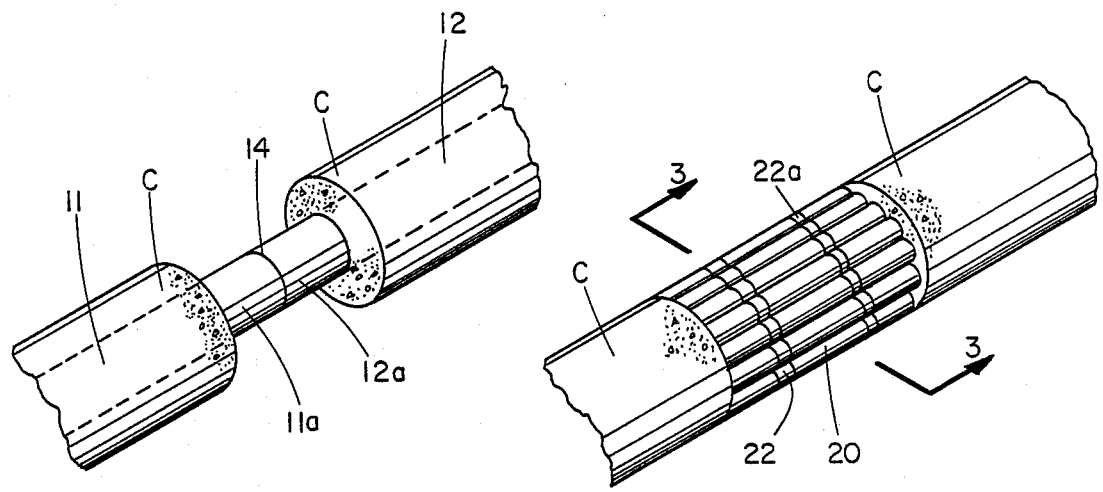
FIG. 1 is an isometric view showing two adjacent joints of pipe with their ends in abutting relationship with the weight coat material applied to the pipe.
FIG. 2 is an isometric view showing the apparatus of the present invention installed on the abutting joints of pipe in the space between adjacent sections of weight coat material.

FIG. 1 of the drawing showing a pipeline designated generally P having a weight coat C which is formed of concrete or other suitable material that is applied to the pipe joints 11 and 12 which are connected together at joint 14. As shown, the pipes 11 and 12 are disposed centrally of the weight coat C which extends circumferentially around the joints of pipe and longitudinally thereof. A portion of the pipes are designated 11a and 12a adjacent their ends which are connected in the joint 14 are not covered by the weight coat C. This uncovered area adjacent the ends is provided to enable the joint 14 to be formed by welding the abutting ends of the joints of pipe 11 and 12 together to form a continuous pipeline.

Figure 4:
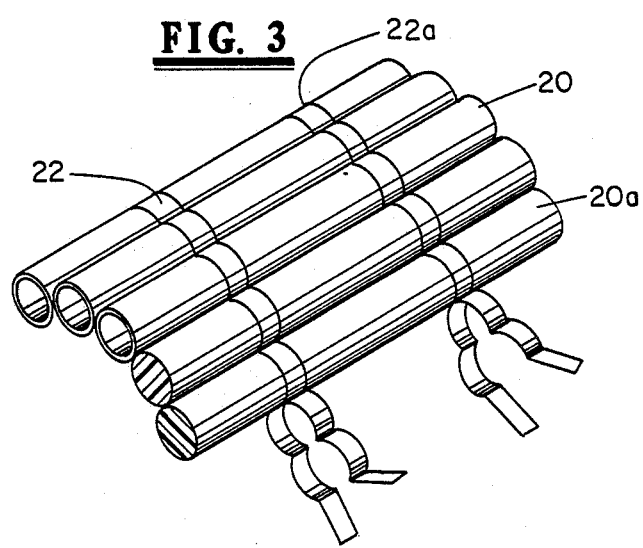
FIG. 4 is an isometric view of a plurality of the protective members jointed together by straps preparatory to being installed in position on the pipe shown in FIG. 2.

A shown in FIG. 2 of the drawings, the apparatus of the present invention is installed in the space between the weight coat material C surrounding the pipes 11 and 12 to provide a protective barrier to protect such pipes against impact by trawler boards which are carried by seines or drag nets through the water by fishing trawlers. The force of an impact by such trawler boards or by the deep keel of a boat moving through the water can cause serious damage to the section of pipe between adjacent portions of weight coat material C. Therefore, the apparatus of the present invention provides a pipeline joint protective sleeve that has an outer diameter that is substantially the same as the outer diameter of the weight coat material C so that the laid line is free of any sharp edge or projection that may snag a net or seine drug along the water bottom. As shown in FIGS. 2 and 4 of the drawings, the impact members 20 and 20a are arranged in side-by-side relationship and connected together by means of transverse straps 22 and 22a that are interwoven around the plastic members such as 20 and 20a to form a continuous barrier of such plastic members. Such plastic impact members may be made of polyethylene or other substantial rigid plastic material having characteristics of high impact resistance. The free ends 24 and 24a of the straps are tied or otherwise secured together after the continuous barrier of plastic members (FIG. 4) has been wrapped around exposed and portions 11a and 12a of the line P. Thus wrapped, as shown in FIG. 2, the plastic members surround the central pipe and substantially fill the space around the pipe to any adjacent sections of weight coat material C. Thus, it will be appreciated that with the plastic tubular barrier wrapped around the exposed pipe in the position as shown in FIG. 2 of the drawings the pipe line will be protected against impact by various devices such as trawler boards which might otherwise damage the exposed pipe joint. Also, it will be appreciated that the tubular member shown in the drawings may either be hollow as shown at 20 or solid in cross-section as shown in 20a and, such pieces may have other configurations other than cylindrical or tubular and may in fact be cut with truncated pie-shaped pieces having a larger arc of curvature on the exterior than on the interior adjacent the joint of pipe.

The hollow impact tubes 20 may be filled with weighted polyurethane foam or other filler material to add impact resistance to the tubes.

Figure 3:
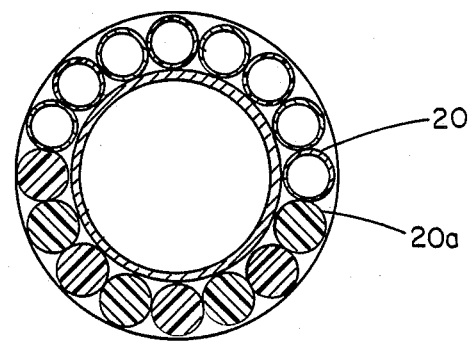
FIG. 3 is a sectional view taken on line 3—3 of FIG. 2 showing the cylindrical or tubular members forming the pipeline joint protector.
Figure 3A:
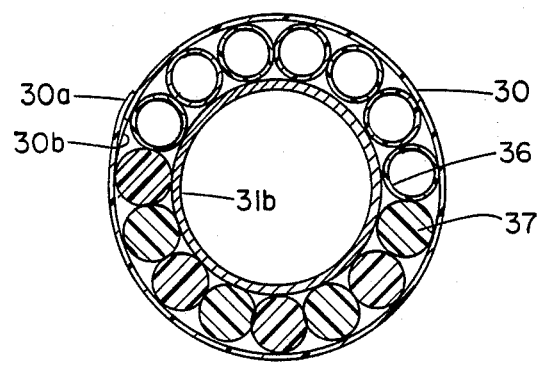
FIG. 3A is a cross-sectional view taken on line 3A—3A of FIG. 3B showing the sleeve with reinforcing members in position on a pipe joint.
Figure 3B:
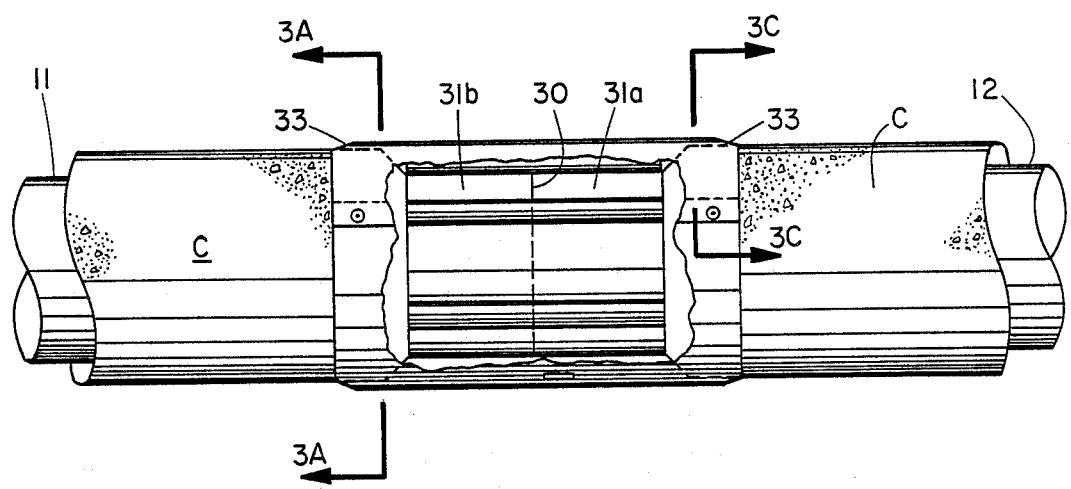
FIG. 3B is a longitudinal view, partially cut away, showing the sleeve and reinforcing members on a pipe joint.

An alternate embodiment of the present invention as shown in FIGS. 3A and 3B which include a sheet of high density plastic material 30 which is wrapped around a pipe joint 31 formed by welding the exposed ends 31a and 31b together to form a protective sleeve. The end portions 33 of the plastic sleeve 30 overlay the ends of the weight coat material on each of the pipe segments 11 and 12. The edge portions 30a and 30b of the sheet material 30 overlap each other and are fixed in this overlapping relationship on the pipe by means of screws 35 or rivets or other suitable pin means. Alternatively, the first or outer edge portion of the sleeve that overlaps the inner edge is welded to the outer surface of the sleeve by conventional plastic welding means to form a longitudinal extending plastic weld extending from end to end of the sleeve. Also, is desired the overlapping edge portion may be tack welded to the sleeve or screws 35 or rivets may be driven through both adjacent edge portions of the sleeve and into the weight coat material.

Also, in this embodiment, a plurality of longitudinal stringers or reinforcing tubes or bars of plastic or other suitable rigid material are provided in the annular space between the central pipes 11 and 12 and the outer sleeve 30 as shown in FIG. 3A of the drawing. Such reinforcing members are preferably of a cross-sectional diameter to fill the radial space between the pipes 11 and 12 and the sleeve 30. Also, the reinforcing members are of sufficient length to extend the full distance between the adjacent ends of the weight coat material C on the pipes 11 and 12.

As shown in FIG. 3, the reinforcing members may be hollow tubes such as 36 or solid bars 37. Also, although the reinforcing members 36 or 37 are shown positioned around the entire circumference of the pipe 11, it will be appreciated that such reinforcing members can be attached to the sheet 30 by tack welding of continuous welds or screws or other means and that spaces may be provided between adjacent longitudinal members, as desired. However, in this embodiment it is preferred that the cross-sectional dimension of the rigid bars or tubes extend from the pipe to the sleeve 30.

Figure 5:
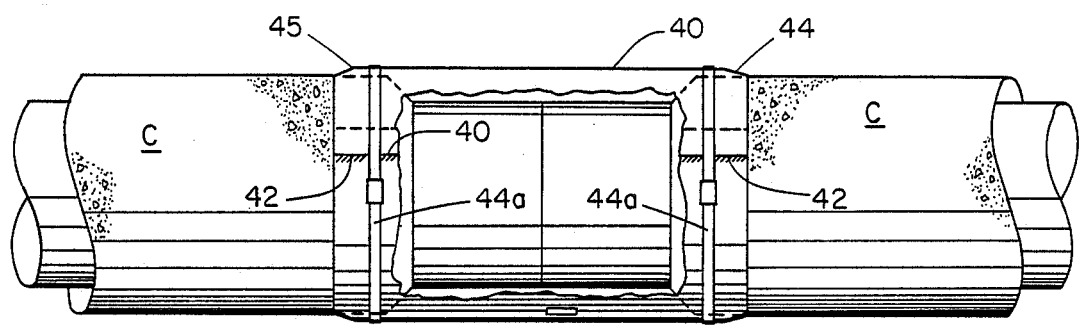
FIG. 5 is a longitudinal view partially cut away showing a sleeve secured on a weight coated pipe joint by means of binder straps.

Another alternate embodiment of the pipe joint protection sleeve of the present invention as shown in FIG. 5 of the drawings wherein a flat sheet of high density plastic material 40 is positioned around a pipe joint with the sheet edges overlaying the weight coat material on pipes 11 and 12. The sheet 40 is wrapped around the pipe joint with the end portions of the sheet overlapping one another as indicated by the outer end 41 and the inner end 42. A weld is preferably placed along the exposed edge of the end 41 to secure it to the adjacent surface of the sheet 40. Two or more straps or bands, preferably metallic, are placed in spaced apart relationship and near the opposite ends of the whole sleeve wrapped tightly around the adjacent ends of the weight coat material C to hold the sleeve in place while the outer exposed edge 41 is being welded to the adjacent surface of the sheet 40. The weld area is indicated at 42 on FIG. 5. In this embodiment of the protective sleeve apparatus, no longitudinally extending reinforcing members, such as shown in FIG. 3A, are provided. Rather, the high density polyethylene sheet or plastic sheet, supported at its ends by the weight coat material is sufficiently strong to withstand impacts of trawler boards or other objects likely to strike the protective sleeve when in place and also to support the pipeline as it moves over rollers on the lay barge and particularly the roller at the end of the stringer where high stresses are imposed upon the pipeline and/or protective sleeve.

Also as shown the edges 44 and 45 of the sheet are tapered to a relatively thin edge to facilitate longitudinal movement of the pipeline on to and of off rollers on the lay barge and stinger. Also the tapered edges provide a relatively smooth transition area between the weight coat and the sleeve to reduce the likelihood that objects, such as trawler nets, will become snagged on the pipeline.

Figure 3C:
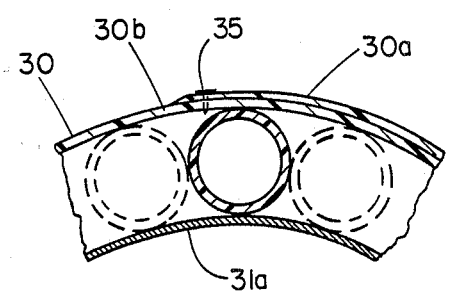
FIG. 3C is a partial sectional view taken on line 3C—3C of FIG. 3B showing a fastening means for securing the sleeve together.
Figure 6:
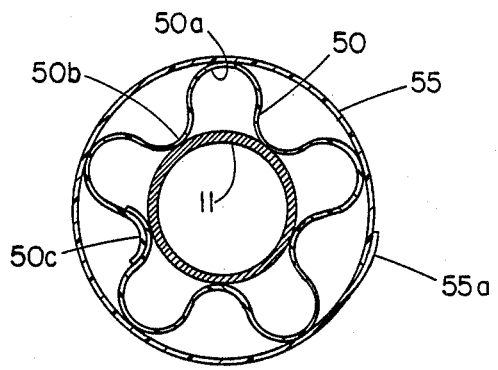
FIG. 6 is an end view of an alternative construction of the protective sleeve position about a pipe.

FIG. 6 shown yet another embodiment of the protective sleeve apparatus of the present invention wherein a corrugated spacer 50 is provided in the annular space between the exterior of the line pipe 11 and the outer high density plastic sleeve 55. As shown, the corrugated spacer 50 is comprised of a sheet formed into a series of alternating curved surfaces creating rounded ridges 50a which engage the outer sleeve 55 and valleys 50b which engage the pipe 11 with overlapping end portions 50c, which, if desired, may be welded together. The outer sleeve 55 is formed of a flat sheet with overlapping ends 55a that are secured together as described with the respect to the sheet in the FIG. 3C embodiment.

The foregoing disclosure and description of the invention are illustrative and explanatory thereof, and various changes in the size, shape and materials, as well as in the details of the illustrated construction may be made without departing from the spirit of the invention.

I claim:

1. A weight coated pipeline joint protective apparatus for protecting pipeline joints against impact or high stress concentrations comprising a high density plastic sheet wrapped around a pipeline joint with the opposite edges of such sheet overlaying the weight of coat material on the abutting pipes forming the joint, with the first end of the sheet overlapping the wrapped sheet with means for securing such first end to the sheet surface near or adjacent the opposite end of such sheet.

2. The invention of claim 1 wherein the means for securing said first end to the sheet near its opposite end comprises a weld formed between said first end and the adjacent surface of the wrapped sheet.

3. The invention of claim 1 wherein the means for securing said first end to the sheet near its opposite end comprises screw means extending through said overlapping end portions of said wrapped sheet.

4. The invention of claim 1 wherein the means for securing said first end to sheet near its opposite end comprises strap means extending around the circumference of said wrapped sheet.

5. The invention of claim 1 including a rigid reinforcing means in the annular space between the pipe joint and the sleeve wrapped around said pipe joint.

6. The invention of claim 5 wherein said rigid reinforcing means extend longitudinally substantially the full length between adjacent ends of the weight coat material on the abutting pipe joints.

7. The invention of claim 5 including a corrugated sheet of high density plastic material extending around the pipe joint within the annular space between the pipe and the high density plastic sheet overlaying the ends of the weight coat material.

* * * * *